United States Patent
Xu et al.

(10) Patent No.: US 10,659,143 B2
(45) Date of Patent: May 19, 2020

(54) DATA COMMUNICATION METHOD, APPARATUS AND SYSTEM

(71) Applicant: Hytera Communications Corporation Limited, Shenzhen, Guangdong (CN)

(72) Inventors: Yan Xu, Shenzhen (CN); Zhenghua Luo, Shenzhen (CN); Chengfu Huang, Shenzhen (CN)

(73) Assignee: Hytera Communications Corporation Limited, Guangdong (CN)

( * ) Notice: Subject to any disclaimer, the term of this patent is extended or adjusted under 35 U.S.C. 154(b) by 0 days.

(21) Appl. No.: 16/309,854

(22) PCT Filed: Mar. 2, 2016

(86) PCT No.: PCT/CN2016/075280
§ 371 (c)(1),
(2) Date: Dec. 13, 2018

(87) PCT Pub. No.: WO2017/147798
PCT Pub. Date: Sep. 8, 2017

(65) Prior Publication Data
US 2019/0280760 A1  Sep. 12, 2019

(51) Int. Cl.
*H04W 74/00* (2009.01)
*H04B 7/155* (2006.01)
*H04W 72/10* (2009.01)

(52) U.S. Cl.
CPC ........ *H04B 7/15542* (2013.01); *H04W 72/10* (2013.01)

(58) Field of Classification Search
CPC . H04W 72/10; H04W 76/34; H04W 28/0252; H04W 72/12; H04W 2215/48;
(Continued)

(56) References Cited

U.S. PATENT DOCUMENTS 8,259,690 B2 * 9/2012 Wiatrowski .......... H04W 76/36
370/337

FOREIGN PATENT DOCUMENTS

CN     1809191 A     7/2006
CN   101491068 A     7/2009
(Continued)

OTHER PUBLICATIONS

International Preliminary Report on Patentability for International Application No. PCT/CN2016/075280 dated Sep. 4, 2018.
(Continued)

*Primary Examiner* — Huy C Ho
(74) *Attorney, Agent, or Firm* — Calfee, Halter & Griswold LLP

(57) ABSTRACT

A method of data communication includes: determining, by a first terminal, an idle channel, and transmitting a data handshake request carrying interruption information on the idle channel, wherein the interruption information at least includes an indication for interrupting a call of a traffic channel; receiving a data handshake response transmitted by a repeater; when the data handshake response is of a type allowing interruption, jumping to the traffic channel designated by the repeater according to a channel jumping indication included in the data handshake response; and when determining that a second terminal occupying the traffic channel making the call interrupts the call and releases a resource of the traffic channel, initiating a call on the traffic channel. The embodiments of the present invention can interrupt the call of the transmitting terminal and release the channel resource, and have strong flexibility and high efficiency.

11 Claims, 12 Drawing Sheets

(58) Field of Classification Search
CPC ............... H04W 52/44; H04B 7/15542; H04L 49/9073; H04N 1/00917
USPC ........................................................ 455/455
See application file for complete search history.

(56) References Cited

FOREIGN PATENT DOCUMENTS

| | | |
|---|---|---|
| CN | 102057636 A | 5/2011 |
| CN | 102158813 A | 8/2011 |
| CN | 104734823 A | 6/2015 |

OTHER PUBLICATIONS

Search Report and English Translation of International Search Report for PCT/CN2016/07280 dated Nov. 30, 2016.
Translation of Written Opinion for International Application No. PCT/CN2016/075280 dated Nov. 30, 2016.
First Office Action for Chinese Patent Application No. 201610122393.2 dated Aug. 2, 2018.
Second Office Action for Chinese Patent Application No. 201610122393.2 dated Mar. 11, 2019.
Third Office Action for Chinese Patent Application No. 201610122393.2 dated Jul. 8, 2019.

* cited by examiner

000
DATA COMMUNICATION METHOD, APPARATUS AND SYSTEM

CROSS REFERENCE TO RELATED APPLICATION

This application is a 371 application of and claims priority to International Application No. PCT/CN2016/075280, filed on Mar. 2, 2016, the entire content of which is incorporated herein by reference.

TECHNICAL FIELD

The embodiments of the present invention relate to the field of communications, and more particularly, to a method, an apparatus and a system for data communication.

BACKGROUND

An Extended Pseudo Trunk (abbreviated as XPT in English) system is a distributed trunking system without a control center. One XPT system may be composed of a plurality of stations, each station has a plurality of repeaters providing a shared channel, and the plurality of repeaters include a fixed master repeater and a plurality of slave repeaters. The XPT system can maximize the system capacity without increasing additional cost, effectively utilize the existing channel resources, and can fully meet the demands of mid-and-low-end trunking customers. The XPT system does not need a designated control channel. This solution can meet US FB6 frequency specifications, and its frequency allocation can be shared with other systems, for example, the same frequency can be allocated to different users. Therefore, the XPT system is widely applied due to low cost and high channel resource utilization thereof.

In the related art, there is a situation that people in the same call always occupy the channel, resulting in a receiving terminal being unable to interrupt a call of a transmitting terminal to initiate a callback. Moreover, in the case that all the channel resources are occupied, users with high priority cannot interrupt the channel resources to initiate a call if they want to initiate a general call or an emergency call. Therefore, there is a need for a method that can interrupt the call of the transmitting terminal to meet the demands of the users.

In the existing centralized trunking system, each terminal is managed by a designated control channel and a specialized control center. At ordinary times, the control channel remains in a long transmission state, and all the terminals are waiting on the control channel. When all the channels in the system are occupied, the control center can release the channel resources by issuing a Reverse Channel (RC) instruction to a designated terminal. However, this method requires the designated control center and the designated control channel to manage the terminals. The issuing the RC instruction to release the channel resources by the control center when the channel resources are fully occupied is not suitable for a receiving terminal of a distributed trunking system without a control center to interrupt a call of a transmitting terminal. Therefore, in the distributed trunking system without a control center, how to use the current system resources to interrupt the call of the transmitting terminal so as to reduce the waste of the channel resources becomes a matter of concern.

SUMMARY

The embodiments of the present invention provide a method, an apparatus and a system for data communication, which can interrupt the call of the transmitting terminal, release the channel resource, and have strong flexibility and high efficiency.

According to a first aspect, an embodiment of the present invention provides a method for data communication applied to a first terminal, wherein the method comprises:

determining an idle channel, and transmitting a data handshake request carrying interruption information on the idle channel, wherein the interruption information at least comprises an indication for interrupting a call of a traffic channel;

receiving a data handshake response transmitted by the repeater;

when a data handshake response is of a type allowing interruption, jumping to a traffic channel designated by the repeater according to a channel jumping indication included in the data handshake response; and when determining that a second terminal occupying the traffic channel making the call interrupts the call and releases a resource of the traffic channel, initiating a call on the traffic channel.

According to a second aspect, an embodiment of the present invention provides a method for data communication applied to a repeater, wherein the method comprises:

detecting a data handshake request carrying interruption information transmitted by a first terminal, wherein the interruption information at least comprises an indication for interrupting a call of a traffic channel;

determining a traffic channel of the interrupted call according to the indication for interrupting the call of the traffic channel;

transmitting a data handshake response to the first terminal, wherein the data handshake response comprises a data handshake response type and a channel jumping indication, the channel jumping indication is configured to indicate the first terminal to jump to a traffic channel designated by the repeater, and the designated traffic channel is the same as the traffic channel of the interrupted call determined; and embedding an indication for interrupting a call on an adjacent channel of the traffic channel of the interrupted call determined, to indicate a second terminal staying on the traffic channel of the interrupted call determined to interrupt the call and release a resource of the traffic channel.

According to a third aspect, an embodiment of the present invention provides an apparatus for data communication, where the apparatus comprises:

a transmitting unit configured to determine an idle channel, and transmit a data handshake request carrying interruption information on the idle channel, wherein the interruption information at least comprises an indication for interrupting a call of a traffic channel;

a receiving unit configured to receive a data handshake response transmitted by a repeater;

a jumping unit configured to, when the data handshake response is of a type allowing interruption, jump to a traffic channel designated by the repeater according to a channel jumping indication included in the data handshake response; and a calling unit configured to, when determining that a second terminal occupying the traffic channel making the call interrupts the call and releases a resource of the traffic channel, initiate a call on the traffic channel.

According to a fourth aspect, an embodiment of the present invention provides an apparatus for data communication, where the apparatus comprises:

a detection unit configured to detect a data handshake request carrying interruption information and transmitted by a first terminal, wherein the interruption information at least comprises an indication for interrupting a call of a traffic channel;

a determination unit configured to determine a traffic channel of the interrupted call according to the indication for interrupting the call of the traffic channel;

a first transmitting unit configured to transmit a data handshake response to the first terminal, wherein the data handshake response comprises a data handshake response type and a channel jumping indication, the channel jumping indication is configured to indicate the first terminal to jump to a traffic channel designated by the repeater, and the designated traffic channel is the same as the traffic channel of the interrupted call determined; and a second transmitting unit configured to embed an indication for interrupting a call on an adjacent channel of the traffic channel of the interrupted call determined, to indicate a second terminal staying on the traffic channel of the interrupted call determined to interrupt the call and release a resource of the traffic channel.

According to a fifth aspect, an embodiment of the present invention provides an apparatus for data communication, comprising a memory and one or more programs, wherein the one or more programs are stored in the memory and configured to be executed by one or more processors containing instructions for performing following operations:

determining an idle channel, and transmitting a data handshake request carrying interruption information on the idle channel, wherein the interruption information at least includes an indication for interrupting a call of a traffic channel;

receiving a data handshake response transmitted by the repeater;

when a data handshake response is of a type allowing interruption, jump to a traffic channel designated by the repeater according to a channel jumping indication included in the data handshake response; and when determining that a second terminal occupying the traffic channel making the call interrupts the call and releases a resource of the traffic channel, initiate a call on the traffic channel.

According to a sixth aspect, an embodiment of the present invention provides an apparatus for data communication, including a memory and one or more programs, wherein the one or more programs are stored in the memory and configured to be executed by one or more processors comprising instructions for performing following operations:

detecting a data handshake request carrying interruption information transmitted by a first terminal, wherein the interruption information at least comprises an indication for interrupting a call of a traffic channel;

determining a traffic channel of the interrupted call according to the indication for interrupting the call of the traffic channel;

transmitting a data handshake response to the first terminal, wherein the data handshake response comprises a data handshake response type and a channel jumping indication, the channel jumping indication is configured to indicate the first terminal to jump to a traffic channel designated by the repeater, and the designated traffic channel is the same as the traffic channel of the interrupted call determined; and embedding an indication for interrupting a call on an adjacent channel of the traffic channel of the interrupted call determined, to indicate a second terminal staying on the traffic channel of the interrupted call determined to interrupt the call and release a resource of the traffic channel.

According to a seventh aspect, an embodiment of the present invention provides a system for data communication, comprising a first terminal, a repeater, and a second terminal, wherein:

the first terminal is configured to: determine an idle channel, and transmit a data handshake request carrying interruption information on the idle channel, wherein the interruption information at least comprises an indication for interrupting a call of a traffic channel; receive a data handshake response transmitted by the repeater; when a data handshake response is of a type allowing interruption, jump to a traffic channel designated by the repeater according to a channel jumping indication included in the data handshake response; and when determining that a second terminal occupying the traffic channel making the call interrupts the call and releases a resource of the traffic channel, initiate a call on the traffic channel;

the repeater is configured to: detect a data handshake request carrying interruption information transmitted by a first terminal, wherein the interruption information at least comprises an indication for interrupting a call of a traffic channel; determine a traffic channel of the interrupted call according to the indication for interrupting the call of the traffic channel; transmit a data handshake response to the first terminal, wherein the data handshake response comprises a data handshake response type and a channel jumping indication, the channel jumping indication is configured to indicate the first terminal to jump to a traffic channel designated by the repeater, and the designated traffic channel is the same as the traffic channel of the interrupted call determined; and embed an indication for interrupting a call an adjacent channel of the traffic channel of the interrupted call determined, to indicate a second terminal staying on the traffic channel of the interrupted call determined to interrupt the call and release a resource of the traffic channel; and the second terminal is configured to: when the indication for interrupting a call is detected on an adjacent channel of the traffic channel initiating the call, transmit the voice end frame to interrupt the call and release the resource of the traffic channel.

According to the method, apparatus and system for data communication provided by the embodiments of the present invention, the terminal may initiate the handshake request comprising the interruption information in the idle channel in the system, and the repeater interrupts the terminal that is performing a call service, releases the corresponding channel resource, and indicates the terminal initiating the handshake request to switch to the interrupted channel to initiate the call. According to the solutions provided by the present invention, the interruption request can be initiated by the terminal, which is flexible to realize, and effectively reduces the waste of the channel resources. Moreover, the interruption request is combined with the handshake request, which saves the air interface overhead and reduces call collision.

BRIEF DESCRIPTION OF THE DRAWINGS

In order to illustrate the technical solutions in the embodiments of the invention or in the related art more clearly, the drawings used in the description of the embodiments or the prior art will be briefly described below. Obviously, the drawings in the following description are merely some embodiments recorded in the invention. For those of ordinary skills in the art, other drawings may also be obtained based on these drawings without going through any creative work.

DETAILED DESCRIPTION

The embodiments of the present invention provide a method, an apparatus and a system for data communication, which can interrupt the call of the transmitting terminal, release the channel resource, and have strong flexibility and high efficiency.

To make those skilled in the art to better understand the solutions in the present invention, the technical solutions in the embodiments of the present invention will be clearly and completely described hereinafter with reference to the drawings in the embodiments of the present invention. It is apparent that the described embodiments are merely some, rather than all embodiments of the present invention. Based on the embodiments of the present invention, all other embodiments obtained by those having ordinary skills in the art without going through any creative work shall fall within the scope of protection of the present invention.

Figure 1:
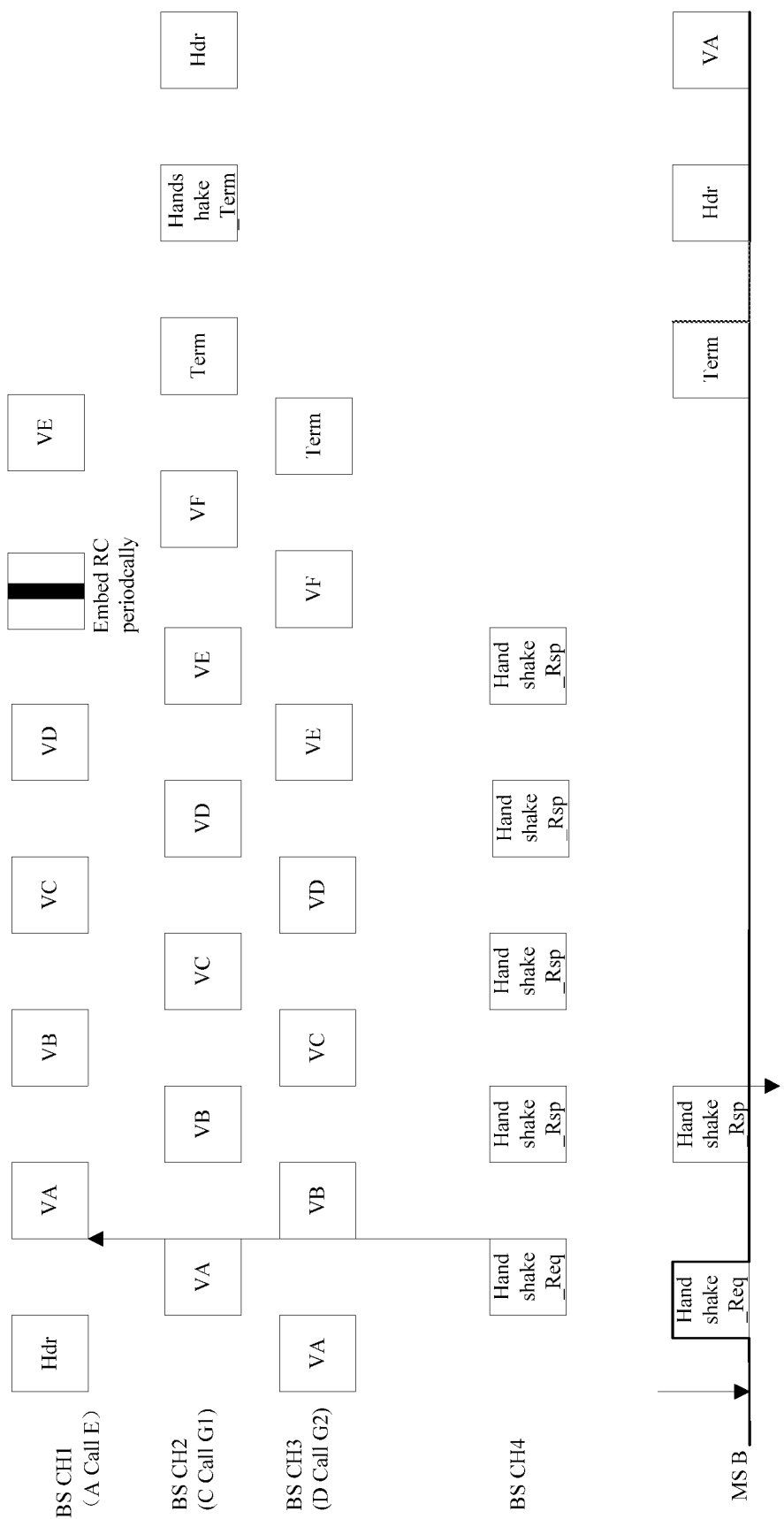
FIG. 1 is a schematic diagram of an application scenario of a method for data communication provided by an embodiment of the present invention.

The method for data communication provided by the embodiments of the present invention can be applied to a distributed trunking system without a control center, such as an XPT system. FIG. 1 is a schematic diagram of an application scenario of a method for data communication provided by an embodiment of the present invention. The above method for data communication will be described below with reference to FIGS. 1 to 12. As shown in FIG. 1, a two-carrier frequency XPT system has three occupied channels including a base station channel 1 (BS CH1), a base station channel 2 (BS CH2) and a base station channel 3 (BS CH3), and only a base station channel 4 (BS CH4) is idle. The BS CH1 and the BS CH2 are different slots of the first carrier frequency; the BS CH3 and the BS CH4 are different slots of the second carrier frequency. The BS CH1 is occupied by a terminal A calling a terminal E (A Call E); the BS CH2 is occupied by a terminal C group-calling group 1 (C Call G1); and the BS CH3 is occupied by a terminal D group-calling group 2 (D Call G2). Hdr represents a voice header, and VA, VB, VC, VD, VE, and VF represent voice A, voice B, voice C, voice D, voice E, and voice F. Term is a voice end frame. A terminal B (MS B) is a member of G1 and is receiving a group call initiated by the terminal C. It is assumed that the terminal B is a first terminal and wants to interrupt the call of the terminal C, so that the terminal B initiates a group call of G1, and members of G1 comprising C can hear the call of the terminal B. The method of the present invention will be described below by taking this application scenario as an example.

Figure 2:
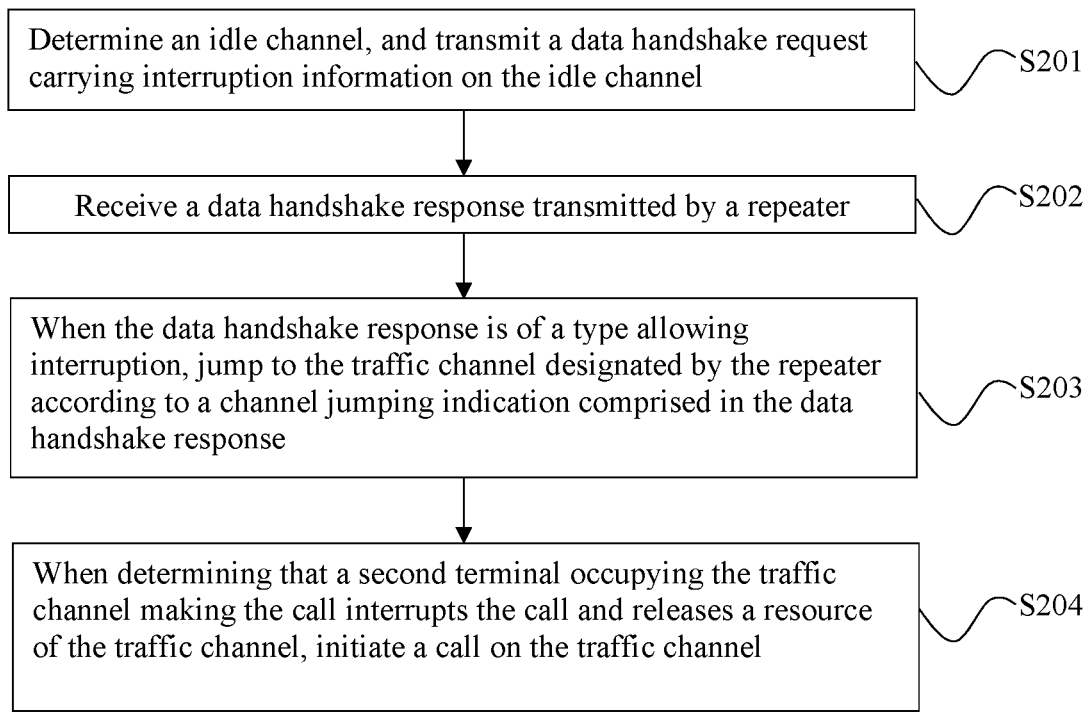
FIG. 2 is a flow chart of a method for data communication provided by an embodiment of the present invention.

FIG. 2 is a flow chart of a method for data communication according to an embodiment of the present invention applied to a terminal. The method may comprise, for example, following steps.

In S201, an idle channel is determined, and a data handshake request carrying interruption information is transmitted on the idle channel, wherein the interruption information at least comprises an indication for interrupting a call of a traffic channel.

In a distributed trunking communication system without a control center, if a first terminal in the system needs to interrupt the call of a transmitting terminal, so that the transmitting terminal releases the occupied traffic channel resource, so that the first terminal can initiate a call by using the released traffic channel resource. Then, the idle channel can be determined, and the data handshake request carrying the interruption information can be transmitted on the idle channel. For example, if the first terminal in the system is receiving a call of a second terminal, if the transmitting terminal, i.e., the second terminal, occupies the channel for a long time, if the first terminal receiving the call wants to interrupt the speech of the transmitting terminal, and initiate a call on the interrupted channel, then the data handshake request carrying interruption information can be transmitted using any idle channel in the system. For another example, when the channel resources are all occupied, if the terminal wants to initiate an alarm, the data handshake request carrying interruption information can be initiated by using the idle channel in the system to interrupt the call of the transmitting terminal.

In some embodiments, the manner to determine the idle channel may be: determining a preset designated interruption channel as the idle channel. In specific implementation, a writing-frequency configuration reserves a designated logic channel for interruption, i.e., the preset designated interruption channel is used for interruption, and cannot be used as a traffic channel. In this implementation manner, when initiating the data handshake request carrying interruption information, the terminal can only jump to the designated logic channel to transmit the data handshake request, and after the data handshake response is received, jumps to the traffic channel of the interrupted call to wait for the channel to be released and reused to initiate the call. Since one designated logic channel is reserved as the designated interruption channel, a success rate for the terminal to interrupt the call of the transmitting terminal is higher, the reliability is high, and the efficiency is high. It should be noted that for different carrier frequencies, only one logic channel needs to be reserved, and it is not necessary to reserve one logic channel for each carrier frequency. Compared with the manner of reserving one logic channel resource for carrier frequency to interrupt the call, the channel resources are saved. In addition, the embodiments of the present invention can either support to interrupt calls between terminals with the same carrier frequency, or support to interrupt calls between terminals with different carrier frequencies.

In some other embodiments, any idle channel within the system can be used for interruption. This manner is not only applicable to interrupt calls of terminals in a single station, but also applicable to interrupt calls of terminals in multiple stations. In particular, in cross-station call interruption, this manner can also increase the usage of the traffic channel of the system and reduce the bandwidth requirements of the system.

In a probable implementation manner, the determining the idle channel may comprise: when determining that a same-station call is received, determining a same-frequency idle channel of the traffic channel receiving the call as the idle channel.

In another probable implementation manner, the determining the idle channel may comprise: determining an idle channel of a free repeater broadcast by a system as an idle channel.

In another probable implementation manner, the determining the idle channel may comprise: when determining that a cross-station call is received, determining a channel receiving the cross-station call as the idle channel.

For example, if the writing-frequency presets a designated interruption channel, enabling the terminal that interrupts the call to jump to the designated interruption channel to initiate a data handshake request carrying interruption information. This manner is more reliable.

For example, if the writing-frequency does not configure a designated interruption channel, enabling the terminal that interrupts the call to select the idle channel in the station to initiate the data handshake request carrying interruption information. This manner is more flexible than the manner the writing-frequency presets the designated interruption channel. When determining the idle channel in the system, the terminal may preferentially select the same-frequency idle channel (another idle slot) that receives the call to transmit the data handshake request carrying interruption information, thereby improving the system access performance of the interrupted call. If another slot in which the terminal is receiving the call is also busy, the terminal switches to a free slot of a free repeater broadcasted by the system to transmit the data handshake request carrying interruption information.

It should be noted that the embodiment of the present invention can also support cross-station call interruption. For example, when the terminal receives a voice call transmitted by other station at a staying station, the terminal can directly initiate a callback interruption on the channel that receives the call at the staying station. In specific implementation, one bit can be added to an embedded voice link control frame LC of an air interface for identifying that it is a cross-station call. When the terminal parses that it is a cross-station call, and initiates a cross-station callback interruption, since the channel uplink is idle, a cross-station data handshake request carrying interruption information can be directly initiated on the channel receiving the call.

After the idle channel is determined, the first terminal can transmit the data handshake request carrying interruption information on the idle channel, wherein the interruption information at least comprises an indication for interrupting a call of a traffic channel.

Figure 3:
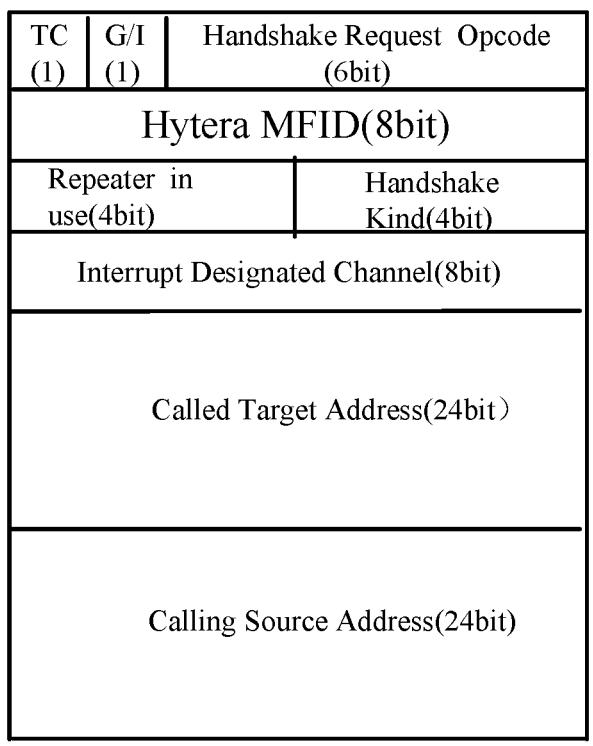
FIG. 3 is a schematic diagram of a frame protocol data unit PDU format of a data handshake request (Handshake Request) carrying interruption information.
Figure 4:
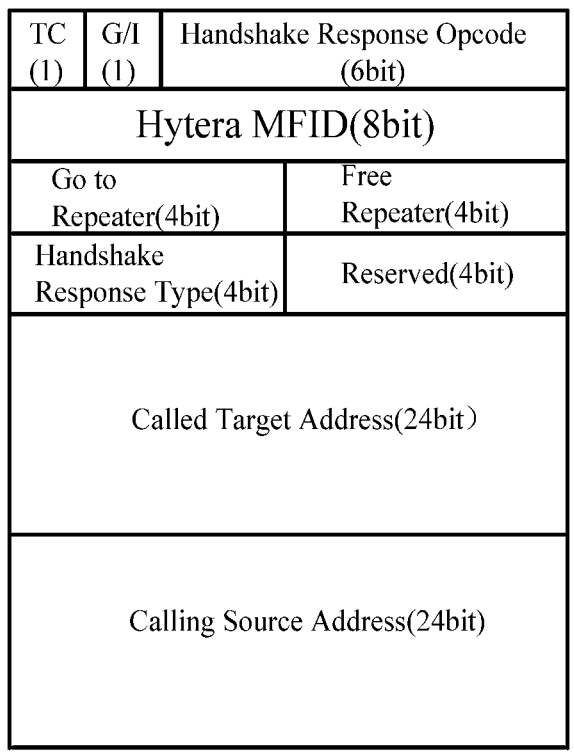
FIG. 4 is a schematic diagram of the PDU format of the data handshake response (Handshake Response)

FIG. 3 is a schematic diagram of a frame protocol data unit (Protocol Data Unit, referred to as PDU) format of a data handshake request (Handshake Request) carrying interruption information. FIG. 4 is a schematic diagram of the PDU format of the data handshake response (Handshake Response).

Table 1 is a PDU information unit definition table of the data handshake request and the data handshake response.

TABLE 1

| Description of Data Handshake Information Contents | | |
|---|---|---|
| Information Element | Length | Remark |
| TDMA Channel (TC) | [0001] | 0-Slot 1<br>1-Slot 2 |
| G/I | 1 | 0- Called Unit is for an Individual MS<br>1- Called Unit is for a group of MSs |
| Handshake Request or Response Opcode | 6 | 101110-Handshake Request Opcode<br>101111-Handshake Response Opcode |
| Hytera MFID | 8 | 01101000-Hytera MFID |
| Request in Use | 4 | 1-15, MS use which repeater to transmit handshake request |
| Free Repeater | 4 | 0- Indicate all repeaters in system are busy.<br>1-15, Inform MS go to free repeater to retry handshake with system. |
| Go to Repeater | 4 | 1-15, Inform MS to access system on arranged repeater |
| Handshake Kind | 4 | 0- Ordinary handshake by default<br>1- Interruption handshake carrying a service includes callback interruption and alarm interruption.<br>2- Interruption handshake remotely controlled to release channel, and only release the channel<br>3-15 Reserve for future use |

TABLE 1-continued

Description of Data Handshake Information Contents

| Information Element | Length | Remark |
| --- | --- | --- |
| Handshake Response Type | 4 | 0- Proceed<br>1- Deny for called unit is proceeding<br>2- Deny for target is unavailable<br>3- Deny for the same call is repeating<br>4- Waiting for Multi-sites handshake response<br>5-Deny for Interrupt Failure<br>6-15 Reserved for future use |
| Interrupt Designated Channel | 8 | 0- No Designated Channel<br>1-255 Designated logic channel |
| Reserved4 | 4 | 0- reserved for future use. |
| Called Target Address | 24 | Target address of a called party in a request call, rather than a repeater address |
| Calling Source Address | 24 | Source address of a caller in a request call, a terminal address initiating a data handshake request |

The Free Repeater: the system selects a repeater comprising a free slot from the list of idle repeaters as the free repeater.

FIG. 4 is a schematic diagram of a data handshake response PDU format transmitted by the repeater.

In S203, when a data handshake response is of a type allowing interruption, jumping to a traffic channel designated by the repeater according to a channel jumping indication included in the data handshake response.

In S204, when determining that a second terminal occupying the traffic channel making the call interrupts the call and releases resources of the traffic channel, a call is initiated on the traffic channel.

The determining that the second terminal occupying the traffic channel making the call interrupts the call and releases a resource of the traffic channel comprises:

when a voice end frame transmitted by the second terminal is detected on the traffic channel, determining that the second terminal occupying the traffic channel making the call interrupts the call and releases the resource of the traffic channel, wherein the voice end frame is configured to show that the second terminal interrupts the call and releases the resource of the traffic channel; or, when a handshake end frame broadcast by the repeater is detected on the traffic channel, determining that the second terminal occupying the traffic channel making the call interrupts the call and releases the resource of the traffic channel, wherein the handshake end frame is configured to indicate that the repeater keeps the traffic channel for the first terminal after the second terminal releases the resource of the traffic channel.

FIG. 1 is taken as an example for explanation. In FIG. 1, Hdr is a voice header, and VA, VB, VC, VD, VE, and VF represent voice A, voice B, voice C, voice D, voice E, and voice F. Term is a voice end frame. Handshake_Term is a handshake end frame. Handshake_Req is a data handshake request, and Handshake_Rsp is a data handshake response. When a terminal B (MS B) receives the group call on the CH2 and presses a PTT to initiate a callback interruption, it needs to jump to an idle channel CH4 in the station or a designated interruption channel preset by the writing-frequency to initiate the data handshake request carrying interruption information. As shown in FIG. 1, a first downward arrow of the MS B indicates that the terminal B jumps from a channel 2 to the idle channel 4 and transmits the data handshake request carrying interruption information (Handshake_Req), that is, the MS B jumps from CH2 to CH4, and transmits Handshake_Req interruption information. As shown in FIG. 1, it appears in BS CH4 that MS B transmits the Handshake_Req, i.e., the data handshake request. As shown in FIG. 1, an arrow of BS CH4 pointing to BS CH1 indicates to transmit an indication of interrupting the call of CH2, and embedding an RC instruction (i.e. transmitting the indication of interrupting the call of CH2, and embedding the RC info on next slot frame (CH1)) on the adjacent slot CH1. Then, the MS B waits for a response from the repeater allowing the interruption to inform it to jump to the traffic channel CH2 which is making a call. As shown in FIG. 1, a second downward arrow of MS B indicates that after the handshake response is detected, it jumps to channel CH2 (after (After Handshake_Rsp is checked, jump to TI_CH:2). MS B initiates callback (B call Back G1) after detecting the voice Term (also called voice end frame, receiving this frame means that the channel is released) or a handshake response end frame (Handshake_Term) of the traffic channel CH2. That is, as shown in FIG. 1: after check Term on TI_CH:2, begin to call back G1. B calls G1, so that people including C can receive the call transmitted by B. After detecting the data handshake request carrying interruption information of MS B, the repeater embeds an RC instruction (Embed RC periodically) in a short period on the adjacent channel CH1 of the CH2.

In some embodiments, after the first terminal determines the idle channel and transmits the data handshake request carrying interruption information on the idle channel, if the data handshake response transmitted by the repeater is received, when a data handshake response type is data handshake waiting response, then the first terminal waits. When determining that the second terminal occupying the traffic channel making the call interrupts the call and releases the resource of the traffic channel, the repeater transmits a data handshake response allowing interruption to the first terminal, and at this time, the first terminal jumps to the traffic channel designated by the repeater and initiates a call according to a channel jumping indication included in the data handshake response. In the implementation manner, after the first terminal determines the idle channel and transmits the data handshake request carrying interruption information on the idle channel, if the data handshake response transmitted by the repeater is a data handshake waiting response, then the first terminal waits on the idle channel; when receiving the data handshake response allowing interruption transmitted by the repeater, the first terminal determines that the second terminal occupying the traffic channel making the call interrupts the call, releases the resources of the traffic channel, and jumps to the traffic channel to initiate a call on the traffic channel.

In some embodiments, if the first terminal initiates a call on the traffic channel, the method may further comprise: when an indication for interrupting a call is detected on an adjacent channel of the traffic channel initiating the call, transmitting the voice end frame to interrupt the call and release the resource of the traffic channel. The indication for interrupting a call may specifically be a reverse channel RC instruction. Of course, the indication for interrupting a call may also be other signaling as long as it can indicate a second terminal staying on the traffic channel of the interrupted call determined to interrupt the call and release a resource of the traffic channel.

In this embodiment, when the terminal in the system is receiving a call, if the transmitting terminal occupies the channel for a long time, the receiving terminal wants to interrupt a speech of the transmitting terminal, and initiates a call on the channel of the interrupted call, it will use any one idle channel in the system to transmit the data handshake request carrying interruption information first, waits for the data handshake response allowing interruption, and then switches to the traffic channel of the ongoing call notified by the repeater, and then initiates a subsequent call after detecting that the traffic channel is released. In this embodiment, the current system resources are used to interrupt the call of a transmitting device by the terminal in the distributed trunking system without a control center, so as to reduce the waste of the channel resources. In addition, the combination of the interruption request with the handshake request not only saves the air interface overhead, but also achieves the advantage of interrupting the call and reducing the call collision.

Figure 5:
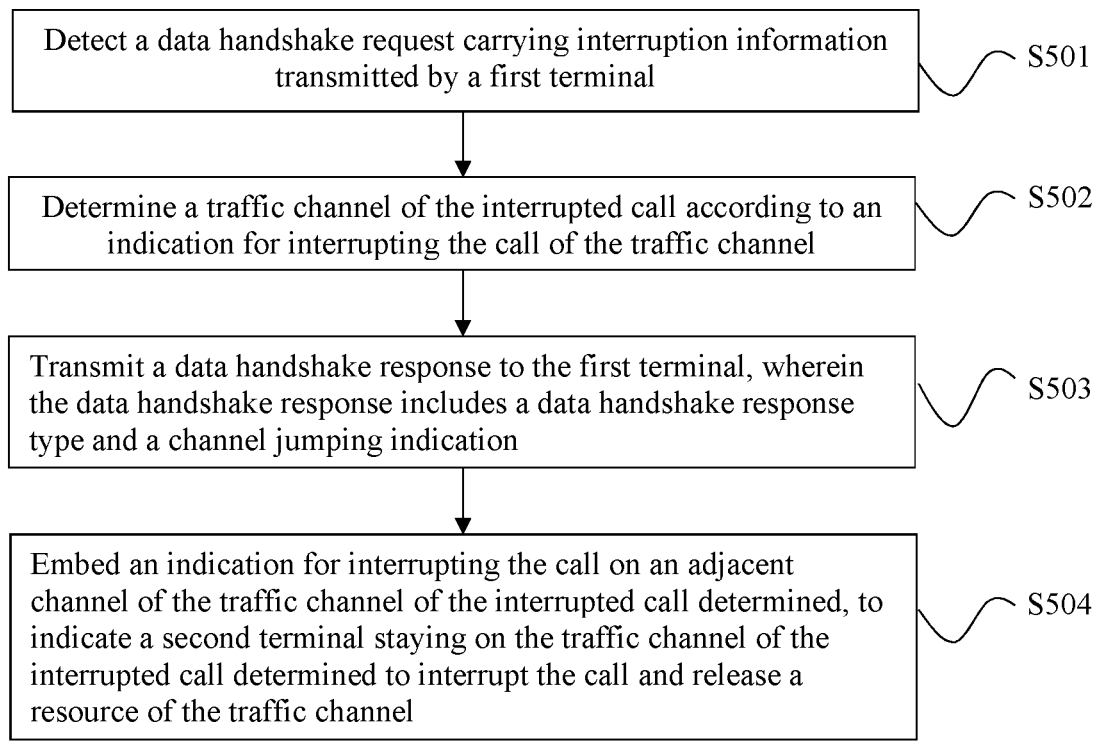
FIG. 5 is a flow chart of a method for data communication provided by an embodiment of the present invention.

FIG. 5 is a flow chart of a method for data communication according to an embodiment of the present invention applied to a repeater. The method may comprise for example, following steps.

In S501, a data handshake request carrying interruption information transmitted by a first terminal is detected.

The interruption information at least comprises an indication for interrupting a call of a traffic channel.

In specific implementation, the repeater detects the data handshake request carrying interruption information on any idle channel or a designated interruption channel preset by writing-frequency, i.e., parses the call handshake request, for example, may comprise parsing a handshake kind, an indication for interrupting a call of a traffic channel, address information, etc.

In S502, a traffic channel of the interrupted call is determined according to the indication for interrupting the call of the traffic channel.

As shown in FIG. 3 and Table 1, an indication for interrupting a call of a traffic channel (Interrupt Designated Channel) may be comprised in the data handshake request. When determining a value in the indication for interrupting the call of the traffic channel is not zero, the traffic channel of the interrupted call is determined according to the value in the indication for interrupting the call of the traffic channel; When the value in the indication for interrupting the call of the traffic channel is zero and a presence of a repeating call corresponding to target address information is determined according to the target address information carried in the data handshake request is determined, a traffic channel corresponding to the repeating call is determined as the traffic channel of the interrupted call; and when the value in the indication for interrupting the call of the traffic channel is zero and a nonpresence of the repeating call corresponding to the target address information is determined according to the target address information carried in the data handshake request is determined, a traffic channel corresponding to a call with a low priority is determined as the traffic channel of the interrupted call according to a preset call priority.

For example, if a value filled in the indication for interrupting the call of the traffic channel is not 0, the repeater interrupts the channel designated by the terminal. If the value filled in the indication for interrupting the call of the traffic channel is 0, the repeater determines which traffic channel to be interrupted. The repeater can check whether the same call is being transferred by analyzing the address information, and if yes, the repeater interrupts the same call being transferred. If it is an emergency call rather than the same call, the repeater can interrupt the call with a low priority in the station first according to the priority of individual call→group call→full call→emergency call from low to high.

In S503, a data handshake response is transmitted to the first terminal, wherein the data handshake response comprises a data handshake response type and a channel jumping indication.

The channel jumping indication is configured to indicate the first terminal to jump to a traffic channel designated by the repeater, and the designated traffic channel is the same as the traffic channel of the interrupted call determined.

In specific implementation, while preparing to interrupt the channel, the repeater should first reply to the terminal with the data handshake response and fill in the channel jumped to and the data handshake response type, so that the terminal knows which channel can be interrupted to initiate a subsequent call thereof. Meanwhile, the repeater controls to embed the indication for interrupting a call in downlink air interface data of the adjacent channel of the interrupted traffic channel, so that the transmitting terminal can cease the call of the transmitting terminal and release the channel resource after detecting the embedded indication for interrupting a call of the adjacent slot.

For convenience of description, the following examples will be described with the indication for interrupting a call being an RC signaling as an example. Of course, the indication for interrupting a call may also be other signaling, such as a user-defined call interruption signaling.

In S504, an indication for interrupting a call is embedded on an adjacent channel of the traffic channel of the interrupted call determined, to indicate a second terminal staying on the traffic channel of the interrupted call determined to interrupt the call and release a resource of the traffic channel.

As shown in FIG. 1, after the idle CH4 detects the data handshake request carrying interruption information, the repeater responds to the terminal with the data handshake response and controls to embed an indication in a short period for interrupting a call, such as an RC signaling, in the middle of an F frame in a voice superframe broadcasted by a downlink air interface in the adjacent channel CH1 of the interrupted channel CH2.

In some embodiments, the embedding the indication for interrupting a call on the adjacent channel of the traffic channel of the interrupted call determined comprises: when determining that the adjacent channel of the traffic channel of the interrupted call broadcasts a data frame (Data), replacing a synchronization pattern of the data frame with the indication for interrupting a call. Further, the replacing the synchronization pattern of the data frame with the indication for interrupting a call is specifically: embedding one indication for interrupting a call in every other synchronization, and when the number of times for embedding the indication for interrupting a call is greater than a preset number of times, ceasing embedding the indication for interrupting a call.

In some embodiments, the embedding the indication for interrupting a call on the adjacent channel of the traffic channel of the interrupted call determined comprises: when determining that the adjacent channel of the traffic channel of the interrupted call broadcasts a voice superframe, embedding the indication for interrupting a call in an F frame of the voice superframe.

Figure 6:
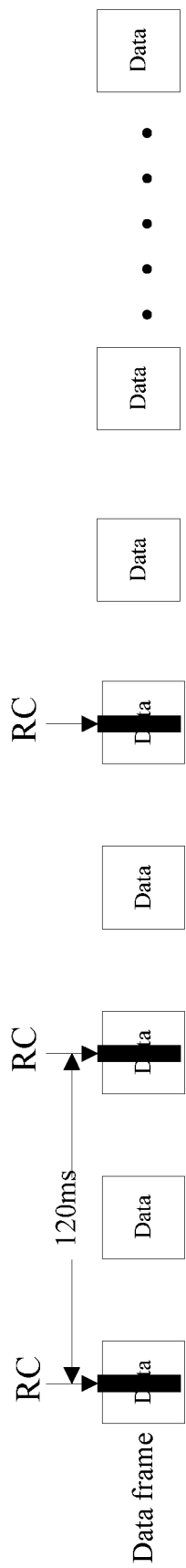
FIG. 6 is a schematic diagram of embedding an RC signaling in a data frame.

Taking the indication for interrupting a call being an RC instruction as an example, the repeater detects a data handshake request frame carrying interruption information on the idle channel or the preset designated interruption channel, and determines which traffic channel to be disconnected, if an adjacent slot of the interrupted traffic channel broadcasts a data frame (Data), then a first data frame synchronization pattern to be forwarded is directly replaced with the embedded RC signaling, and then the RC is embedded in the data frame in every two frames, a data frame synchronization pattern of a third frame is replaced with the embedded RC signaling, and the RC signaling is embedded for three times in succession to ensure that the transmitting terminal can detect the RC signaling in the adjacent slot. A period of the embedded RC is 120 ms. FIG. 6 is a schematic diagram of embedding the RC signaling in the data frame.

Figure 7:
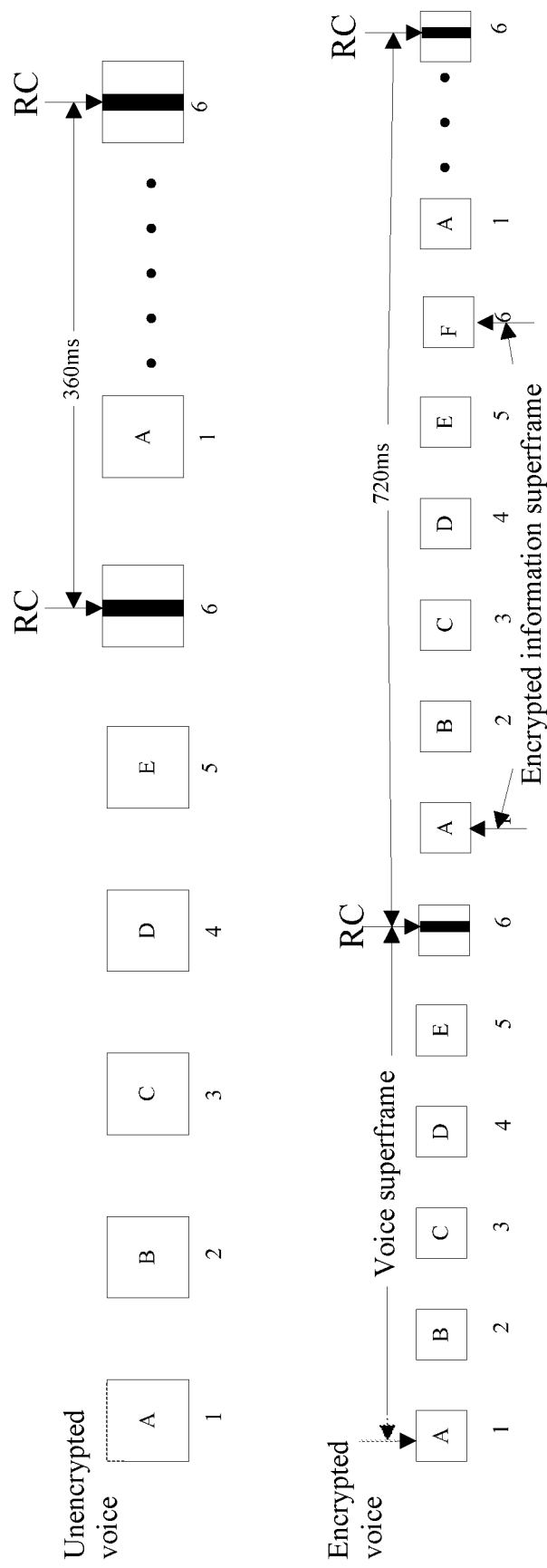
FIG. 7 is a schematic diagram of embedding an RC signaling in a voice frame.

For example, if the adjacent slot of the interrupted traffic channel broadcasts unencrypted voice frames (A, B, C, D, E and F), the RC is embedded in an F frame position of a downlink forwarded voice superframe, and a 32-bit signaling in the voice F is switched to be embedded RC, and the RC is embedded in an F frame of next voice superframe again, and the embedded RC signaling is continuously embedded for three times, and the interval for continuously embedding the RC for twice is 360 ms. If the adjacent slot of the interrupted traffic channel broadcasts encrypted voice frames (A, B, C, D, E and F), the RC can only be embedded in an F frame position of the voice superframe, and superframes of encrypted information (A, B, C, D, E and F) cannot be embedded, so the interval for continuously embedding the RC for the encrypted voice for twice is 720 ms. FIG. 7 is a schematic diagram of embedding the RC signaling in the voice frame.

In some embodiments, the data handshake request received by the repeater further comprises a handshake kind. The method further comprises: parsing the data handshake request, and when a handshake kind of the data handshake request is an interruption request carrying a service, keeping the traffic channel for the first terminal. In specific implementation, if the handshake kind (Handshake Kind) is 1, it indicates that the interruption is an interruption handshake carrying a service, and the terminal continues a subsequent transmission service after the channel is interrupted. After the channel is interrupted, the repeater needs to keep the channel for an interrupting party if new uplink information is not received. If the handshake type is 2, it indicates that this interruption is to remotely release the channel, the terminal only releases the channel, and has no follow-up service to transmit. The repeater does not need to keep the channel for the interrupting party.

In some embodiments, the keeping the traffic channel for the first terminal comprises: when a voice end frame transmitted by the second terminal is detected on the traffic channel of the interrupted call determined, controlling the traffic channel to be switched from a forwarding service state to a handshake keeping state, and transmitting, by the repeater, a handshake end frame on the traffic channel, wherein the voice end frame is configured to show that the second terminal interrupts the call and releases the resource of the traffic channel; wherein the handshake end frame is configured to indicate that the repeater keeps the traffic channel for the first terminal after the second terminal releases the resource of the traffic channel. For example, the repeater keeps the traffic channel for the first terminal by transmitting a handshake response end frame for a period of time, which may be 360 ms.

Figure 8:
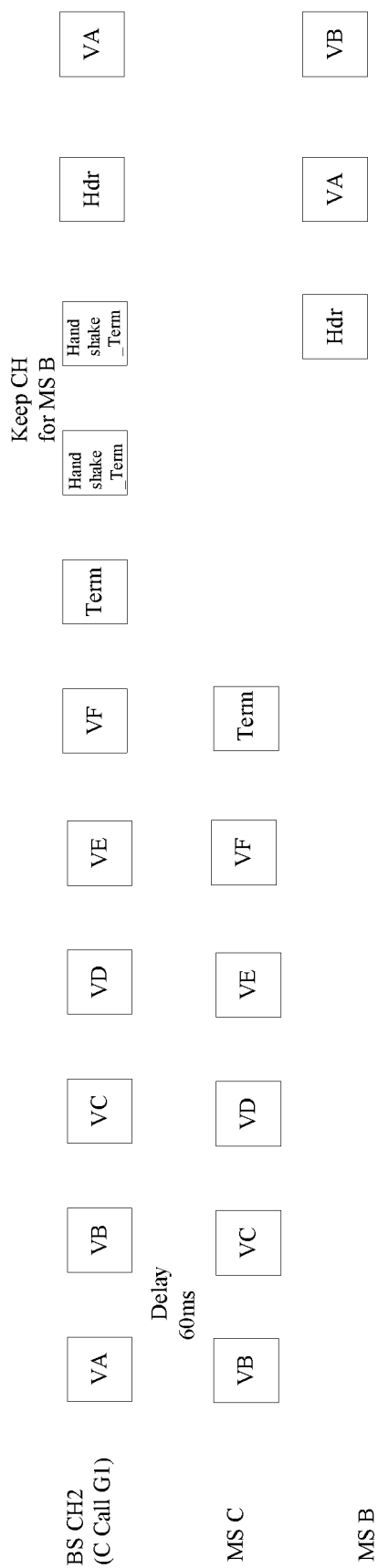
FIG. 8 is a schematic diagram of a method for a repeater to keep a channel for an interrupted terminal.

For example, FIG. 8 is a schematic diagram of a method for the repeater to keep the channel for the interrupted terminal. The repeater determines that it is an interruption handshake carrying a service by parsing the handshake kind carried in the handshake request to be 1, and needs to keep the channel for the interrupting party after the channel is released. After the traffic channel CH2 of the interrupted call detects a voice end frame Term transmitted by the interrupted party MS C, the system needs to control the traffic channel CH2 of the interrupted call to switch from a forwarding service state (Repeating) to the handshake hangtime (Handshake hangtime), the repeater needs to keep the channel for the interrupted party terminal B (MS B) (Keep CH For MS B), and uplink frames of another terminals detected during the channel keeping period are directly discarded.

In some embodiments, when determining that the data handshake request carrying interruption information is a cross-station data handshake request, the repeater transmits the cross-station data handshake request to a source station corresponding to the data handshake request carrying interruption information; then the transmitting the data handshake response to the first terminal comprises: receiving the data handshake response transmitted by the source station; when the data handshake response is a response allowing interruption, transmitting the data handshake response to the first terminal, wherein the data handshake response is of a type allowing interruption; and when the data handshake response is a response denying interruption, transmitting the data handshake response to the first terminal, wherein the data handshake response is of a type denying interruption. The specific implementation can be implemented by referring to the methods of FIG. 11 and FIG. 12.

Figure 9:
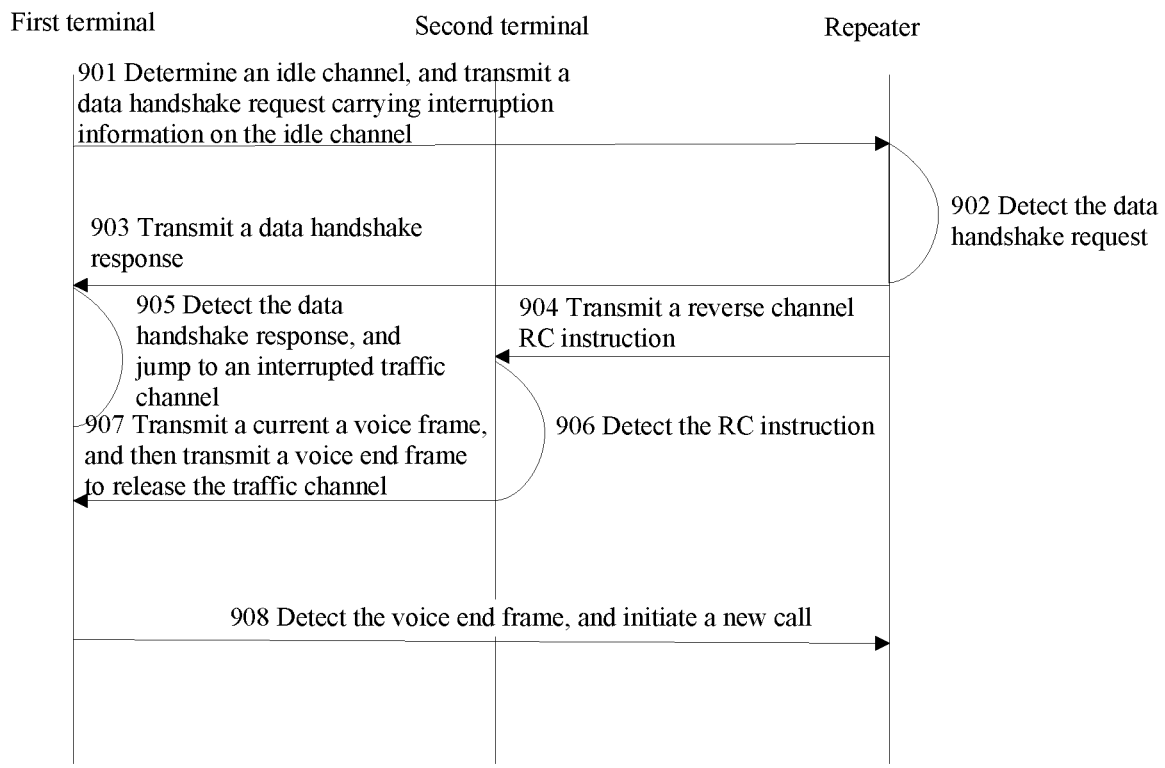
FIG. 9 is a flow chart of a method for data communication provided by another embodiment of the present invention.

FIG. 9 is a flow chart of a method for data communication according to still another embodiment of the present invention. The method may comprise, for example, following steps:

In S901, a first terminal determines an idle channel, and transmits a data handshake request carrying interruption information on the idle channel.

In S902, the repeater detects the data handshake request.

In S903, the repeater transmits a data handshake response.

In S904, the repeater transmits an RC instruction.

In S905, the first terminal detects the handshake response and jumps to an interrupted traffic channel.

In S906, a second terminal detects the RC instruction.

The second terminal is an interrupted party and also a transmitting party. The transmitting terminal transmits a voice at CH2, and detects whether there is an RC in the adjacent channel CH1 while transmitting each frame of voice. When RC is detected, it is parsed to be a cease transmission request (0101) according to Table 2, and transmitting cannot be ceased unless the interrupted party enables the function that the call can be interrupted. If a cease transmission command (0100) is parsed, the terminal has to cease transmitting thereof regardless of whether the terminal enables the function that the call can be interrupted. In this implementation, the cease transmission command is usually controlled and initiated by a dispatching console, and the dispatching console decides which call to be interrupted, and notifies the repeater to fill in the RC command as the cease transmission command.

TABLE 2

| | RC Information RC Command | |
|---|---|---|
| Length | Value | Description |
| 4 | $0000_2$ | Increase power by one step |
| | $0001_2$ | Decrease power by one step |
| | $0010_2$ | Set power to highest |
| | $0011_2$ | Set power to lowest |
| | $0100_2$ | Cease transmission command |
| | $0101_2$ | Cease transmission request |
| | $0110_2$ to $1111_2$ | Reserved for future use |

NOTE:
The power step size is manufacturer dependent.

In S907, the second terminal transmits a current voice frame, and then transmits a voice end frame to release the channel.

In S908, the first terminal detects the voice end frame, and initiates a call on the interrupted traffic channel.

Figure 10:
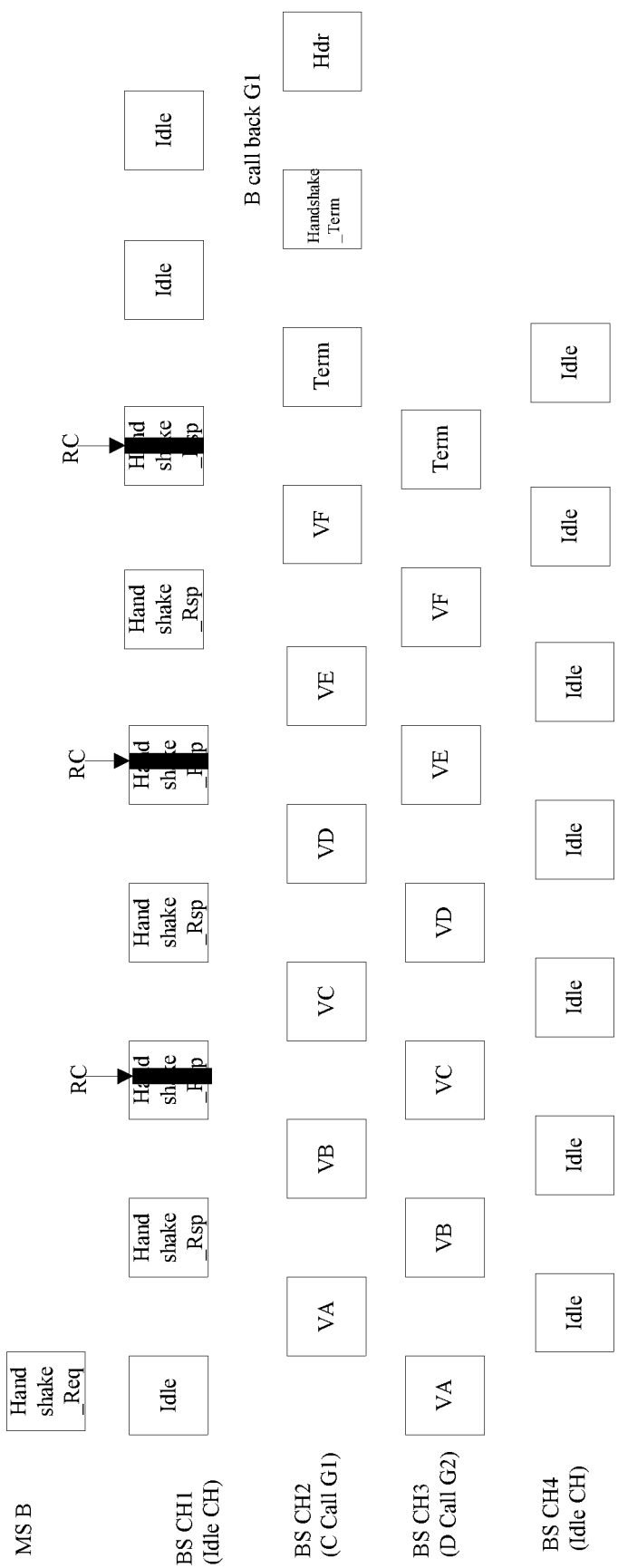
FIG. 10 is a schematic diagram of a method for data communication provided by still another embodiment of the present invention.

FIG. 10 is a schematic diagram of a method for data communication provided by still another embodiment of the present invention. In this embodiment, handshake interruption of a same-frequency idle channel in a single station preferentially selected by the terminal is introduced in detail. There are four channels CH1 to CH4 in the two-carrier frequency XPT system shown in FIG. 10, where CH2 and CH3 are forwarding a call service, BS CH2 is occupied by a service of a terminal C that calls group 1 (C call G1), BS CH3 is occupied by a service of a terminal D that calls group 2 (D call G2), and BS CH1 and BS CH4 are in an idle (Idle CH) state.

When the interrupting terminal MS B is in a phase of receiving a voice call thereof on the service channel CH2, the interrupting terminal MS B presses PTT (Push to Talk in English) to initiate a callback to interrupt the transmission of the transmitting terminal MS C and initiate a voice call, so that all group call G1 members including MS C can receive the call. MS B detects that another slot receiving the call is idle, i.e., there is a same-frequency idle channel. The interrupting terminal MS B uses the same-frequency idle channel CH1 to transmit the data handshake request carrying interruption information Handshake_Req, waits for the repeater to respond with the Handshake_Rsp and notify it to jump to CH2, and switches to CH2 to initiate a callback after CH2 detects channel release (by receiving the voice end frame Term and its own handshake end frame (Handshake_Term) to identify channel release).

The repeater receives the data handshake request carrying interruption information Handshake_Req on the traffic channel CH1, and forwards the data handshake response Handshake_Rsp for a period of time (360 ms in the figure) in next 60 ms, and determines that the interrupted traffic channel is CH2, so a reverse channel signaling RC is embedded every 120 ms in a data frame broadcast by an air interface on CH1, so as to interrupt the call of CH2.

When the interrupted terminal MS C transmits the voice on CH2, it receives and detects whether the same-frequency adjacent slot CH1 has the broadcast reverse channel signaling RC. If the reverse channel signaling RC is detected and a cease transmission command is determined, the MS C transmits the current voice frame, and then transmits one voice end frame Term to cease the transmission, and releases the channel.

Figure 11:
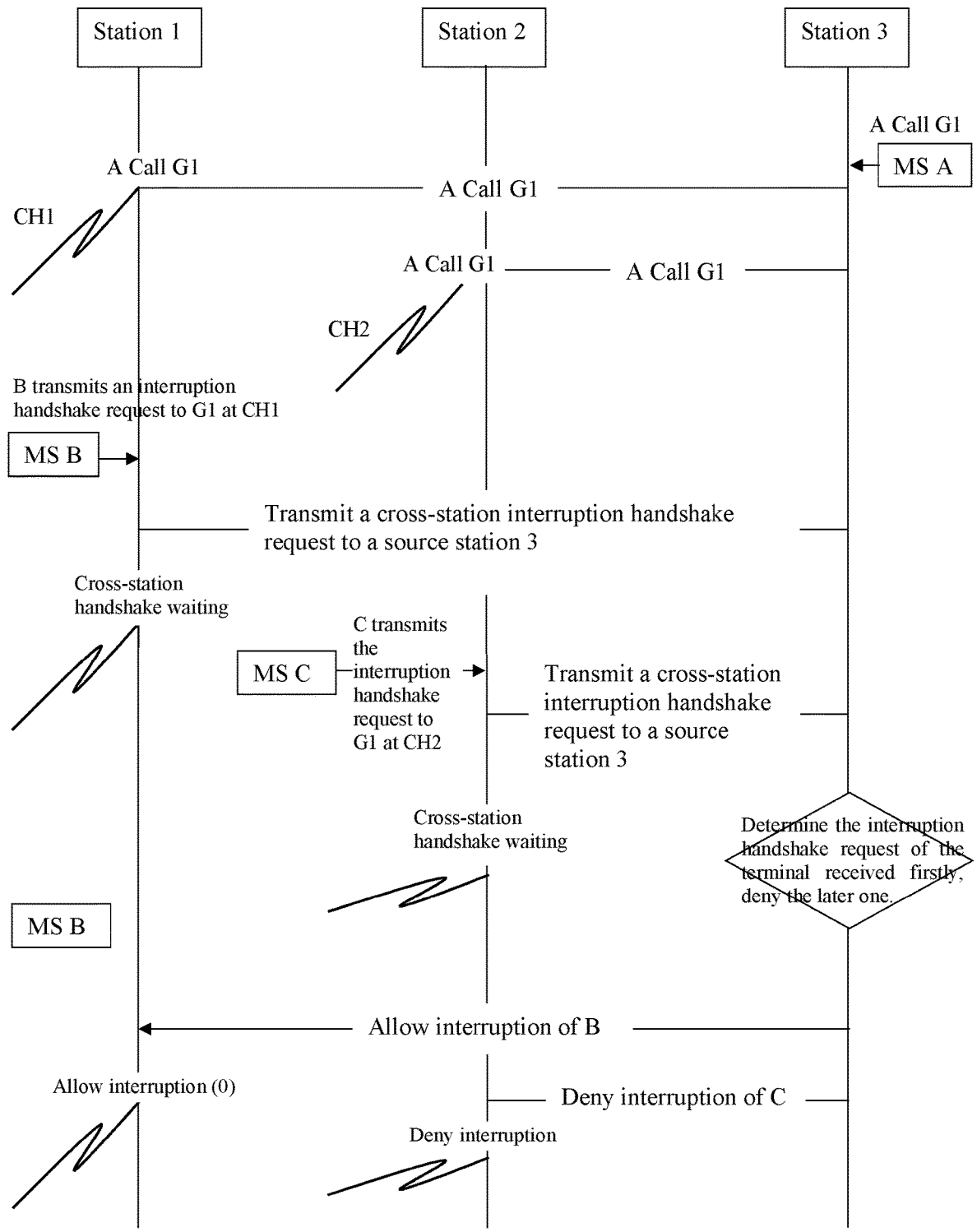
FIG. 11 is a schematic diagram of a method for data communication provided by still another embodiment of the present invention.

FIG. 11 is a schematic diagram of a method for data communication provided by still another embodiment of the present invention.

The solutions of the present invention can be used for interrupting calls in a single station as well as interrupting calls in multiple stations. The embodiment shown in FIG. 11 is described by taking an example of a cross-station callback interruption in a multi-station system.

As shown in FIG. 11, a terminal MS A initiates a group call at a station 3 (terminal A calls group 1, i.e., A Call G1). A terminal MS B stays at station 1 and receives a group call (A Call G1) on a channel 1 (CH1). A terminal MS C stays at station 2 and receives a group call (A Call G1) on a channel 2 (CH2). A case where two terminals MS B and MS C in different stations receive a cross-station call and simultaneously initiate an interruption handshake is taken as an example for description hereinafter.

As shown in FIG. 11, when the MS B of the station 1 receives the cross-station group call at the CH1 of the staying station, and identities the call is a cross-station call, the channel CH1 receiving the call is selected to initiate a data handshake request carrying interruption information, so as to interrupt the call of G1. Meanwhile, the MS C of the station 2 initiates a data handshake request carrying interruption information using the channel CH2 for receiving the call in the station 2.

It should be noted that when the terminal receives a voice call transmitted by other station at the staying station, the terminal can directly initiate a callback interruption on the channel that receives the call at the staying station. Because the channel uplink is idle; in specific implementation, one bit can be added to an embedded voice link control frame LC of an air interface for identifying that it is a cross-station call. When the terminal parses the call to be a cross-station call and initiates a cross-station callback interruption, the cross-station handshake request carrying interruption information can be directly initiated on the channel receiving the call.

The repeater of the station 1 or the station 2 detects the data handshake request carrying interruption information, and only issues the data handshake request carrying interruption information to the source station 3 of G1 that initiates the group-calling by cross stations, and meanwhile, transmits cross-station handshake waiting on the downlink of the repeater receiving the request (a data handshake response type is 4). The source station 3 determines which data handshake request carrying interruption information to be processed. The general rule is to process the requests according to the time sequence. If the source station 3 receives the cross-station handshake request of MS B first, then it replies the station 1 to allow B to interrupt the call, and then receives the cross-station handshake request of MS C, and replies the station 2 to deny C to interrupt the call.

The repeater of the station 1 receives the response information allowing B to interrupt the call, and issues the data handshake response (a data handshake response type is 0) allowing interruption on the air interface; MS B receives the data handshake response allowing to interrupt the call, stays at the traffic channel of A Call G1, and waits for A to release the channel.

The repeater of the station 2 receives a response to deny C to interrupt the call, and issues the data handshake response (a data handshake response is 5) for denying interruption at the air interface, MS C receives the data handshake response denying interruption performed by the same call, and notifies the user with an indication that "the call interruption is failed".

The repeater shall reserve the channel for the terminal that successfully interrupts the call, in order to prevent the channel from being preempted.

Figure 12:
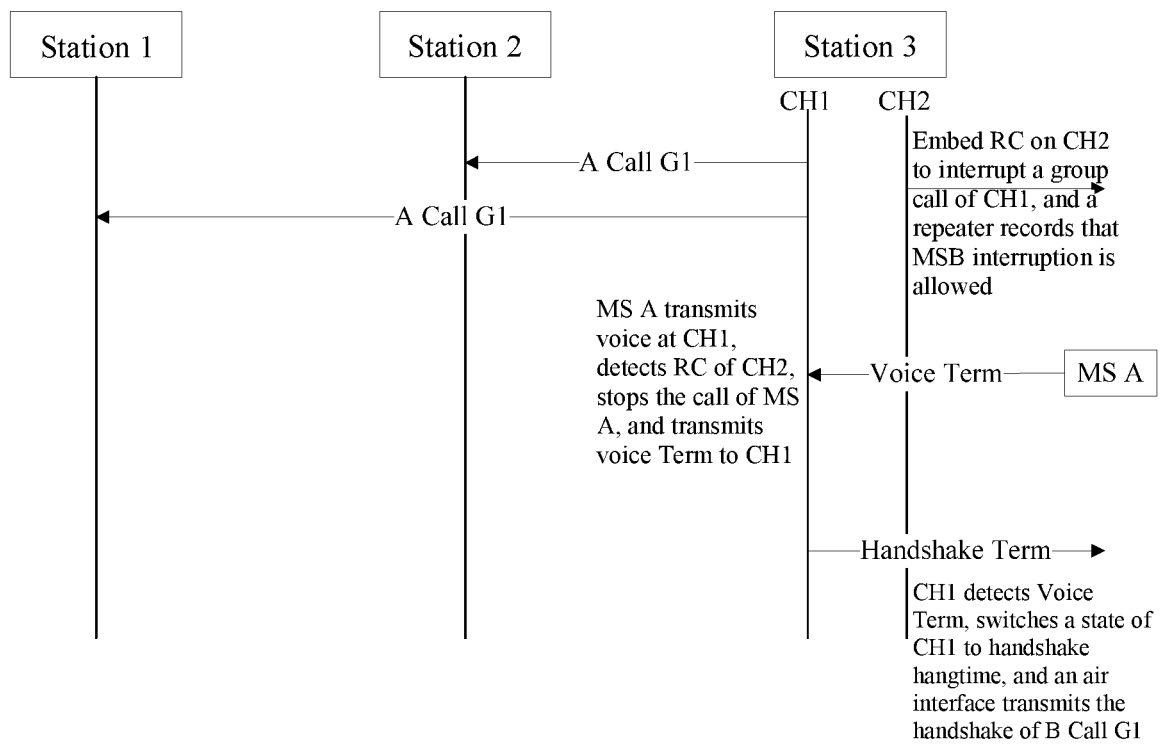
FIG. 12 is a schematic diagram of a method for data communication provided by still another embodiment of the present invention.

As shown in FIG. 12, after the repeater of the source station receives the cross-station handshake request, it needs to notify to embed an RC in the adjacent channels (CH2) of the interrupted traffic channel (CH1), so as to interrupt the group call of CH1, and the source station also needs to record the interruption request initiated by which terminal (MS B) is allowed.

When the source station detects a voice Term frame on the interrupted traffic channel (CH1), a state of CH1 needs to be switched from Repeating to handshake hangtime, and meanwhile, a downlink air interface of CH1 is controlled to start to forward the handshake Term (a source address is filled with MS B and a target address is filled with G1), which is intended to reserve the channel for MS B, and only MS B is allowed to initiate the call during the handshake hangtime.

MS B waits for CH1 to release the channel. If MS B detects the voice end frame Voice Term or the handshake end frame Handshake_Term, it is indicated that CH1 has been released, and MS B directly initiates a voice on CH1.

In some embodiments, if an administrator in the system finds that there is a terminal occupying the channel for a long time without releasing the channel resources, the data handshake request carrying interruption information (a handshake kind needs to be set as 2) can be transmitted by controlling a free repeater or a designated interruption channel preset by writing-frequency in the system through a programmable key, so as to release the channel occupied for a long time. The repeater embeds a reverse channel signaling in the adjacent channel occupying the channel, so that the interrupted party (transmitting terminal) ceases transmission and releases the channel. In this application scenario, the repeater does not need to keep the channel after detecting the voice Term, and is directly switched from a forwarding service state (Repeating) to a channel idle state (Channel Idle).

In some embodiments, the terminal can initiate an alarm service. An application of the alarm service in interrupting a call is explained with the example of reserving a designated interruption channel by a writing-frequency configuration. When transmitting an alarm service, the terminal initiates a data handshake request carrying interruption information on the designated interruption channel firstly, and the repeater decides which voice business being transmitted to be interrupted or repeating call hangtime, and then notifies the terminal to switch to the traffic channel of the interrupted call for subsequent alarm service.

In some embodiments, a dispatching console may directly issue a violent interruption instruction (RC in Table 2 is 0100) to interrupt the designated traffic channel. After receiving the violent interruption instruction, the repeater embeds the RC in the downlink of the adjacent channel of the designated traffic channel of interrupted call, and notifies the terminal to automatically release the channel. When all the channels in the system are occupied, only the dispatching console can control the issuance of the violent interruption instruction to release the channel. In addition, the dispatching console can also support the issuance of a cease transmission command (0101), and the second terminal can cease transmission only if the second terminal enables the function that the call can be interrupted. If the second terminal detects the cease transmission command, but does not enable the function that the call can be interrupted, the transmission of the second terminal will not be affected.

In the method for data communication provided by the embodiments of the present invention, the terminal can first transmit the data handshake request carrying interruption information on any idle channel in the system, wait for the data handshake response allowing interruption, then switch to the traffic channel performing the call notified by the repeater, and initiate a subsequent call after detecting the release of the traffic channel. Any idle channel in the system includes the idle channel allocated by the system and the designated interruption channel preset by writing-frequency. When the terminal selects the idle channel allocated by the system to initiate the data handshake request, the terminal initiates handshake interruption using the same-frequency idle channel stayed preferentially, which can improve the system access performance of the interrupted call.

In the method for data communication provided by the present invention, any free repeater in the system interrupts the traffic channel performing the call when detecting the data handshake request carrying interruption information, and notifies the terminal to switch to the traffic channel of the interrupted call for a subsequent call. When interrupting the traffic channel, the repeater interrupts the same call firstly, and then preferentially interrupts the traffic channel with low priority according to the call priority. In addition, the repeater can flexibly adjust the embedding rule of the reverse channel signaling according to a type of an air interface frame forwarded by the traffic channel, so as to improve the system access performance of the interrupted call.

In the method for data communication provided by the present invention, the call interruption function for cross-station call is also supported. The cross-station call can initiate a handshake interruption on the channel receiving the call, thus improving the effective utilization of the channel resources.

In conclusion, the embodiments of the present invention can achieve the following beneficial effects:

1. The handshake is combined with the call interruption to provide a more effective interruption scheme for the distributed trunking system, and can interrupt the call with less traffic channel resources.

2. The interruption of the cross-station call can initiate the handshake interruption on the traffic channel receiving the call to achieve the object of interrupting the call without needing to waste resources of the idle channels.

3. The system keeps the channel for the interruption carrying a service, which can reduce call collision in the system and ensure that only one of a plurality of terminals is allowed to successfully interrupt the call.

4. The embedding rule of the reverse channel signaling is flexibly adjusted according to the type of the air interface frame, which improves the system access performance of the interrupted call.

An apparatus corresponding to the method provided by the embodiments of the present invention is introduced below.

Figure 13:
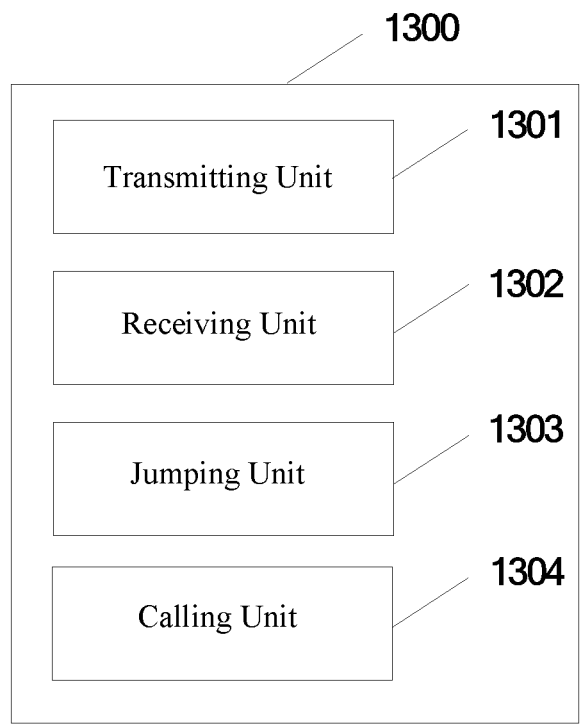
FIG. 13 is a schematic diagram of an apparatus for data communication provided by an embodiment of the present invention.

FIG. 13 is a schematic diagram of an apparatus for data communication provided by an embodiment of the present invention. The apparatus may include:

a transmitting unit 1301 configured to determine an idle channel, and transmit a data handshake request carrying interruption information on the idle channel, wherein the interruption information at least includes an indication for interrupting a call of a traffic channel;

a receiving unit 1302 configured to receive a data handshake response transmitted by a repeater;

a jumping unit 1303 configured to, when the data handshake response is of a type allowing interruption, jump to a traffic channel designated by the repeater according to a channel jumping indication included in the data handshake response; and a calling unit 1304 configured to, when determining that a second terminal occupying the traffic channel making the call interrupts the call and releases a resource of the traffic channel, initiate a call on the traffic channel.

Further, the calling unit is specifically configured to, when a voice end frame transmitted by the second terminal is detected on the traffic channel, determine that the second terminal occupying the traffic channel making the call interrupts the call and releases the resource of the traffic channel, wherein the voice end frame is configured to show that the second terminal interrupts the call and releases the resource of the traffic channel; or, when a handshake end frame broadcast by the repeater is detected on the traffic channel, determine that the second terminal occupying the traffic channel making the call interrupts the call and releases the resource of the traffic channel, wherein the handshake end frame is configured to indicate that the repeater keeps the traffic channel for the first terminal after the second terminal releases the resource of the traffic channel.

Further, the transmitting unit is specifically configured to: determine a preset designated interruption channel as the idle channel; or, when determining that a same-station call is received, determine a same-frequency idle channel of the traffic channel receiving the call as the idle channel; or, determine an idle channel of a free repeater broadcast by a system as an idle channel; or, when determining that a cross-station call is received, determine a channel receiving the cross-station call as the idle channel.

Further, the apparatus further comprises:

a releasing unit configured to, when the indication for interrupting a call is detected on an adjacent channel of the traffic channel initiating the call, transmit the voice end frame to interrupt the call and release the resource of the traffic channel.

Figure 14:
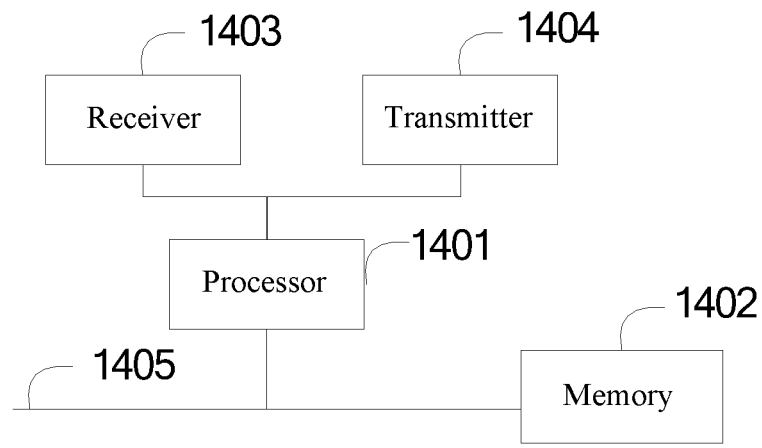
FIG. 14 is a schematic diagram of an apparatus for data communication provided by another embodiment of the present invention.

FIG. 14 is a block diagram of an apparatus for data communication provided by another embodiment of the present invention, at least one processor 1401 (e.g., CPU), a memory 1402, a receiver 1403, a transmitter 1404, and at least one communication bus 1405 configured to achieve connection communication among the apparatuses. The processor 1401 is configured to execute executable modules, such as computer programs, stored in the memory 1402. The memory 1402 may include a high speed Random Access Memory (RAM), and may also include a non-volatile memory, such as at least one disk memory. One or more programs are stored in the memory and are configured to be executed by one or more processors 1401 including instructions for performing the following operations:

determining an idle channel, and transmitting a data handshake request carrying interruption information on the idle channel, wherein the interruption information at least includes an indication for interrupting a call of a traffic channel;

receiving a data handshake response transmitted by the repeater;

when the data handshake response is of a type allowing interruption, jumping to a traffic channel designated by the repeater according to a channel jumping indication included in the data handshake response; and when determining that a second terminal occupying the traffic channel making the call interrupts the call and releases a resource of the traffic channel, initiating a call on the traffic channel.

In some embodiments, the processor 1401 is specifically configured to execute the one or more programs including instructions for performing the following operations:

when a voice end frame transmitted by the second terminal or a handshake end frame broadcasted by the repeater is detected on the traffic channel, initiating a call on the traffic channel, wherein the voice end frame is configured to show that the second terminal interrupts the call and releases the resource of the traffic channel; and the handshake end frame is configured to indicate that the repeater keeps the traffic channel for the first terminal after the second terminal releases the resource of the traffic channel.

In some embodiments, the processor 1401 is specifically configured to execute the one or more programs comprising instructions for performing the following operations:

determining a preset designated interruption channel as the idle channel; or, when determining that a same-station call is received, determining a same-frequency idle channel of the traffic channel receiving the call as the idle channel; or, determining an idle channel of a free repeater broadcast by a system as an idle channel; or, when determining that a cross-station call is received, determining a channel receiving the cross-station call as the idle channel.

In some embodiments, the processor 1401 is specifically configured to execute the one or more programs including instructions for performing the following operations:

when an indication for interrupting a call is detected on an adjacent channel of the traffic channel initiating the call, transmitting the voice end frame to interrupt the call and release the resource of the traffic channel.

Figure 15:
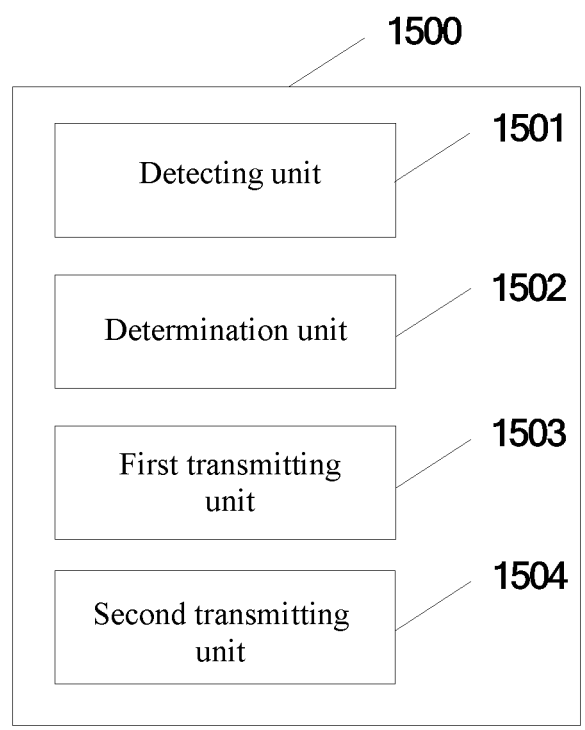
FIG. 15 is a schematic diagram of an apparatus for data communication provided by further embodiment of the present invention.

FIG. 15 is a schematic diagram of an apparatus for data communication provided by an embodiment of the present invention. The apparatus may comprise:

a detection unit 1501 configured to detect a data handshake request carrying interruption information and transmitted by a first terminal, wherein the interruption information at least comprises an indication for interrupting a call of a traffic channel;

a determination unit 1502 configured to determine a traffic channel of the interrupted call according to the indication for interrupting the call of the traffic channel;

a first transmitting unit 1503 configured to transmit a data handshake response to the first terminal, wherein the data handshake response comprises a data handshake response type and a channel jumping indication, the channel jumping indication is configured to indicate the first terminal to jump to a traffic channel designated by the repeater, and the designated traffic channel is the same as the traffic channel of the interrupted call determined; and a second transmitting unit 1504 configured to embed an indication for interrupting a call on an adjacent channel of the traffic channel of the interrupted call determined, to indicate a second terminal staying on the traffic channel of the interrupted call determined to interrupt the call and release a resource of the traffic channel.

Further, the determination unit is specifically configured to:

when a value in the indication for interrupting the call of the traffic channel is not zero, determine the traffic channel of the interrupted call according to the value in the indication for interrupting the call of the traffic channel;

when the value in the indication for interrupting the call of the traffic channel is zero and a presence of a repeating call corresponding to target address information is determined according to the target address information carried in the data handshake request is determined, determine a traffic channel corresponding to the repeating call as the traffic channel of the interrupted call; and when the value in the indication for interrupting the call of the traffic channel is zero and a nonpresence of the repeating call corresponding to the target address information is determined according to the target address information carried in the data handshake request is determined, determine a traffic channel corresponding to a call with a low priority as the traffic channel of the interrupted call according to a preset call priority.

Further, the second transmitting unit is specifically configured to:

when determining that the adjacent channel of the traffic channel of the interrupted call broadcasts a data frame, replace a synchronization pattern of the data frame with the indication for interrupting a call; and when determining that the adjacent channel of the traffic channel of the interrupted call broadcasts a voice superframe, embed the indication for interrupting a call in the voice superframe.

a keeping unit configured to, when a handshake kind of the data handshake request is an interruption request carrying a service, keep the traffic channel for the first terminal.

Further, the keeping unit is specifically configured to:

when a voice end frame transmitted by the second terminal is detected on the traffic channel of the interrupted call determined, control the traffic channel to be switched from a forwarding service state to a handshake keeping state, and transmit, by the repeater, a handshake end frame on the traffic channel, wherein the voice end frame is configured to show that the second terminal interrupts the call and releases the resource of the traffic channel; and the handshake end frame is configured to indicate that the repeater keeps the traffic channel for the first terminal after the second terminal releases the resource of the traffic channel. Further, the apparatus further includes:

a third sending unit configured to, when determining that the data handshake request carrying interruption information is a cross-station data handshake request, transmit the cross-station data handshake request to a source station corresponding to the data handshake request carrying interruption information.

The first transmitting unit is specifically configured to: receive the data handshake response transmitted by the source station; when the data handshake response is a response allowing interruption, transmit the data handshake response to the first terminal, wherein the data handshake response is of a type allowing interruption; and when the data handshake response is a response denying interruption, transmit the data handshake response to the first terminal, wherein the data handshake response is of a type denying interruption.

Figure 16:
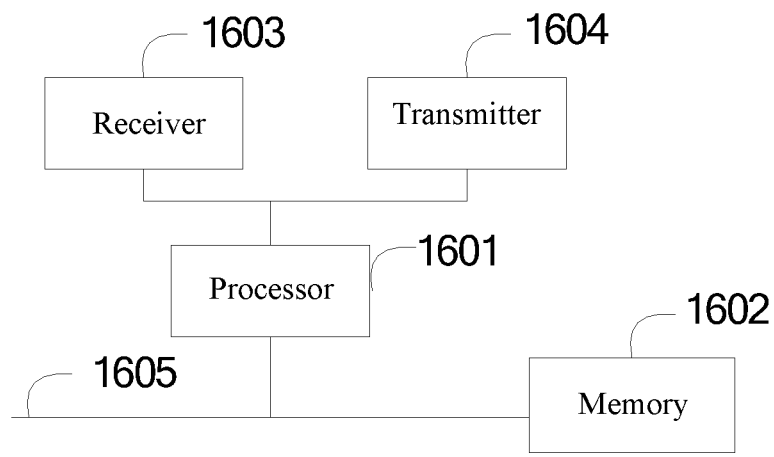
FIG. 16 is a schematic diagram of an apparatus for data communication provided by still another embodiment of the present invention.

FIG. 16 is a block diagram of an apparatus for data communication provided by another embodiment of the present invention, comprising at least one processor 1601 (e.g., CPU), a memory 1602, a receiver 1603, a transmitter 1604, and at least one communication bus 1605 configured to achieve connection communication among the apparatuses. The processor 1601 is configured to execute executable modules, such as computer programs, stored in the memory 1602. The memory 1602 may include a high speed Random Access Memory (RAM), and may also comprise a non-volatile memory, such as at least one disk memory. One or more programs are stored in the memory and are configured to be executed by one or more processors 1601 comprising instructions for performing the following operations:

detecting a data handshake request carrying interruption information transmitted by a first terminal, wherein the interruption information at least includes an indication for interrupting a call of a traffic channel;

determining a traffic channel of the interrupted call according to the indication for interrupting the call of the traffic channel;

transmitting a data handshake response to the first terminal, wherein the data handshake response includes a data handshake response type and a channel jumping indication, the channel jumping indication is configured to indicate the first terminal to jump to a traffic channel designated by the repeater, and the designated traffic channel is the same as the traffic channel of the traffic channel of the interrupted call determined; and embedding an indication for interrupting a call on an adjacent channel of the traffic channel of the interrupted call determined, to indicate a second terminal staying on the traffic channel of the interrupted call determined to interrupt the call and release a resource of the traffic channel.

In some embodiments, the processor 1601 is specifically configured to execute the one or more programs comprising instructions for performing the following operations:

when a value in the indication for interrupting the call of the traffic channel is not zero, determining the traffic channel of the interrupted call according to the value in the indication for interrupting the call of the traffic channel;

when the value in the indication for interrupting the call of the traffic channel is zero and a presence of a repeating call corresponding to target address information is determined according to the target address information carried in the data handshake request is determined, determining a traffic channel corresponding to the repeating call as the traffic channel of the interrupted call; and when the value in the indication for interrupting the call of the traffic channel is zero and a nonpresence of the repeating call corresponding to the target address information is determined according to the target address information carried in the data handshake request is determined, determining a traffic channel corresponding to a call with a low priority as the traffic channel of the interrupted call according to a preset call priority.

In some embodiments, the processor 1601 is specifically configured to execute the one or more programs comprising instructions for performing the following operations:

when determining that the adjacent channel of the traffic channel of the interrupted call broadcasts a data frame, replacing a synchronization pattern of the data frame with the indication for interrupting a call; and when determining that the adjacent channel of the traffic channel of the interrupted call broadcasts a voice superframe, embedding the indication for interrupting a call in the voice superframe.

In some embodiments, the processor 1601 is specifically configured to execute the one or more programs comprising instructions for performing the following operations:

parsing the data handshake request, and when a handshake kind of the data handshake request is an interruption request carrying a service, keeping the traffic channel for the first terminal.

In some embodiments, the processor 1601 is specifically configured to execute the one or more programs comprising instructions for performing the following operations:

when a voice end frame transmitted by the second terminal is detected on the traffic channel of the interrupted call determined, controlling the traffic channel to be switched from a forwarding service state to a handshake keeping state, and transmitting, by the repeater, a handshake end frame on the traffic channel, wherein the voice end frame is configured to show that the second terminal interrupts the call and releases the resource of the traffic channel; and the handshake end frame is configured to indicate that the repeater keeps the traffic channel for the first terminal after the second terminal releases the resource of the traffic channel.

In some embodiments, the processor 1601 is specifically configured to execute the one or more programs comprising instructions for performing the following operations:

when determining that the data handshake request carrying interruption information is a cross-station data handshake request, transmitting the cross-station data handshake request to a source station corresponding to the data handshake request carrying interruption information;

The transmitting the data handshake response to the first terminal comprises:

receiving the data handshake response transmitted by the source station;

when the data handshake response is a response allowing interruption, transmitting the data handshake response to the first terminal, wherein the data handshake response is of a type allowing interruption; and when the data handshake response is a response denying interruption, transmitting the data handshake response to the first terminal, wherein the data handshake response is of a type denying interruption.

Figure 17:
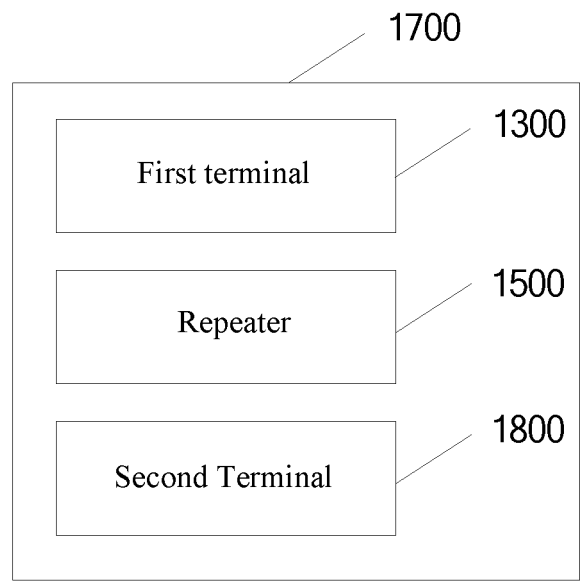
FIG. 17 is a schematic diagram of a system for data communication provided by still another embodiment of the present invention.

FIG. 17 is a schematic diagram of a system for data communication provided by still another embodiment of the present invention.

The system for data communication 1700 comprises a first terminal 1300, a repeater 1500, and a second terminal 1800, wherein:

the first terminal 1300 is configured to: determine an idle channel, and transmit a data handshake request carrying interruption information on the idle channel, wherein the interruption information at least comprises an indication for interrupting a call of a traffic channel; receive a data handshake response transmitted by the repeater; when the data handshake response is of a type allowing interruption, jump to a traffic channel designated by the repeater according to a channel jumping indication included in the data handshake response; and when determining that a second terminal occupying the traffic channel making the call interrupts the call and releases a resource of the traffic channel, initiate a call on the traffic channel;

the repeater 1500 is configured to detect a data handshake request carrying interruption information transmitted by a first terminal, wherein the interruption information at least comprises an indication for interrupting a call of a traffic channel; determine a traffic channel of the interrupted call according to the indication for interrupting the call of the traffic channel; transmit a data handshake response to the first terminal, wherein the data handshake response includes a data handshake response type and a channel jumping indication, the channel jumping indication is configured to indicate the first terminal to jump to a traffic channel designated by the repeater, and the designated traffic channel is the same as the traffic channel of the interrupted call determined; and embed an indication for interrupting a call an adjacent channel of the traffic channel of the interrupted call determined, to indicate a second terminal staying on the traffic channel of the interrupted call determined to interrupt the call and release a resource of the traffic channel; and the second terminal 1800 is configured to, when the indication for interrupting a call is detected on an adjacent channel of the traffic channel initiating the call, transmit the voice end frame to interrupt the call and release the resource of the traffic channel.

The implementation of the first terminal and the repeater can refer to the implementation of the embodiments as shown in FIGS. 13 to 16.

Other embodiments of the present invention will be apparent to those skilled in the art from consideration of the specification and practice of the invention disclosed here. The present invention is intended to embrace any variations, uses or adaptations of the present invention that follow the general principles of the present invention and include common knowledge or customary practice in the technical fields not disclosed in the present invention. The specification and embodiments are considered as examples only, with a true scope and spirit of the present invention being indicated by the following claims.

It will be appreciated that the present invention is not limited to the exact construction that has been described above and illustrated in the accompanying drawings, and that various modifications and changes can be made without departing from the scope thereof. The scope of the present invention should only be limited by the appended claims.

Those described above are merely preferred embodiments of the present invention, but are not intended to limit the present invention. Any modifications, equivalent substitutions and improvements made without departing from the principle of the present invention shall all fall in the scope of protection of the present invention.

It should be noted that relational terms herein such as first and second, etc., are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, method, article, or device including a plurality of elements includes not only those elements but also includes other elements not expressly listed, or also includes elements inherent to such a process, method, item, or device. In the absence of further limitation, an element defined by the phrase "including a . . . " does not exclude the presence of the same element in the process, method, article, or device. The present invention may be described in the general context of computer-executable instructions executed by a computer, such as a program module. Generally, the program module includes routines, programs, objects, components, data structures, and the like that perform particular tasks or implement particular abstract data types. The present invention may also be practiced in distributed computing environments where tasks are performed by remote processing devices that are connected through a communication network. In the distributed computing environments, the program module can be located in both local and remote computer storage media including storage devices.

The various embodiments in this specification are described in a progressive manner, and the same and similar parts among the various embodiments can be referred to each other. Each embodiment focuses on the differences from other embodiments. In particular, the apparatus embodiments are described simply since the apparatus embodiments are basically similar to the method embodiments, and the relevant points can refer to the partial explanation of the method embodiments. The apparatus embodiments described above are only exemplary, wherein the units illustrated as separated parts may either be or not physically separated, and the parts displayed as units may either be or not physical units, i.e., may be located in one place, or may be distributed on multiple network units. Some or all of the modules may be selected according to actual needs to achieve the objectives of the solutions in the embodiments. Those of ordinary skill in the art can understand and implement without going through any creative efforts. The descriptions above are merely detailed embodiments of the present invention, and it should be noted that those of ordinary skills in the art may make a plurality of improvements and decorations without departing from the principle of the present invention, and these improvements and decorations shall also fall within the protection scope of the present invention.

The invention claimed is:

1. A method for data communication applied to a first terminal, comprising:
    determining an idle channel, and transmitting a data handshake request carrying interruption information on the idle channel, wherein the interruption information at least comprises an indication for interrupting a call of a traffic channel;
    receiving a data handshake response transmitted by a repeater;
    when the data handshake response is of a type allowing interruption, jumping to the traffic channel designated by the repeater according to a channel jumping indication comprised in the data handshake response; and
    when determining that a second terminal occupying the traffic channel interrupts the call and releases a resource of the traffic channel, initiating a new call on the traffic channel.

2. The method according to claim 1, wherein the determining that the second terminal occupying the traffic channel interrupts the call and releases resources of the traffic channel comprises:
    when a voice end frame transmitted by the second terminal is detected on the traffic channel, determining that the second terminal occupying the traffic channel interrupts the call and releases the resource of the traffic channel, wherein the voice end frame is configured to show that the second terminal interrupts the call and releases the resource of the traffic channel; or,
    when a handshake end frame broadcast by the repeater is detected on the traffic channel, determining that the second terminal occupying the traffic channel interrupts the call and releases the resource of the traffic channel, wherein the handshake end frame is configured to indicate that the repeater keeps the traffic channel for the first terminal after the second terminal releases the resource of the traffic channel.

3. The method according to claim 1, wherein the determining the idle channel comprises:
    determining a preset designated interruption channel as the idle channel; or,
    when determining that a same-station call is received, determining a same-frequency idle channel of the traffic channel receiving the call as the idle channel; or,
    determining an idle channel of a free repeater broadcast by a system as the idle channel; or,
    when determining that a cross-station call is received, determining a channel receiving the cross-station call as the idle channel.

4. The method according to claim 1, further comprising:
    when an indication for interrupting the call is detected on an adjacent channel of the traffic channel initiating the call, transmitting the voice end frame to interrupt the call and release the resource of the traffic channel.

5. The method according to claim 1, further comprising:
    after receiving the data handshake response transmitted by the repeater, when the data handshake response type is a data handshake waiting response, waiting on the idle channel;
    when determined by the repeater that the second terminal occupying the traffic channel interrupts the call and releases the resource of the traffic channel, receiving the data handshake response allowing interruption transmitted by the repeater; and
    jumping to the traffic channel designated by the repeater, and initiating the new call according to the channel jumping indication included in the data handshake response.

6. The method according to claim 1, wherein jumping to the traffic channel designated by the repeater according to the channel jumping indication comprised in the data handshake response comprises:
    when a channel in the indication for interrupting the call of the traffic channel is not designated, determining the traffic channel of the interrupted call according to a value in the indication for interrupting the call of the traffic channel;
    when the channel in the indication for interrupting the call of the traffic channel is not designated and a presence of a repeating call corresponding to a target address information is determined according to the target address information carried in the data handshake request is determined, determining the traffic channel corresponding to the repeating call as the traffic channel of the interrupted call; and
    when the channel in the indication for interrupting the call of the traffic channel is not designated and a non-presence of the repeating call corresponding to the target address information is determined according to the target address information carried in the data handshake request is determined, determining the traffic channel corresponding to a call with a low priority as the traffic channel of the interrupted call according to a preset call priority.

7. The method according to claim 1, wherein the data handshake request further comprises a handshake kind, and the method further comprises:
    when the handshake kind of the data handshake request is an interruption request carrying a service, keeping the traffic channel for the first terminal.

8. The method according to claim 7, wherein keeping the traffic channel for the first terminal comprises:
    when a voice end frame transmitted by the second terminal is detected on the traffic channel of the interrupted call, controlling the traffic channel to be switched from a forwarding service state to a handshake keeping state, and transmitting, by the repeater, a handshake end frame on the traffic channel, wherein the voice end frame is configured to show that the second terminal interrupts the call and releases the resource of the traffic channel; and
    the handshake end frame is configured to indicate that the repeater keeps the traffic channel for the first terminal after the second terminal releases the resource of the traffic channel.

9. The method according to claim 1, further comprises:
when the data handshake request carrying interruption information is a cross-station data handshake request, the repeater transmits the cross-station data handshake request to a source station corresponding to the data handshake request, wherein receiving the data handshake response transmitted by the repeater comprises:
when the data handshake response transmitted by the source station and received by the repeater is the type allowing interruption, receiving the data handshake response allowing interruption transmitted by the repeater; and
when the data handshake response transmitted by the source station and received by the repeater is the type denying interruption, receiving the data handshake response denying interruption transmitted by the repeater.

10. An apparatus for data communication, comprising:
a transmitting unit configured to determine an idle channel, and transmit a data handshake request carrying interruption information on the idle channel, wherein the interruption information at least comprises an indication for interrupting a call of a traffic channel;
a receiving unit configured to receive a data handshake response transmitted by a repeater;
a jumping unit configured to, when the data handshake response is of a type allowing interruption, jump to the traffic channel designated by the repeater according to a channel jumping indication comprised in the data handshake response; and
a calling unit configured to, when determining that a second terminal occupying the traffic channel interrupts the call and releases a resource of the traffic channel, initiate a new call on the traffic channel.

11. An apparatus for data communication, comprising a memory and one or more programs, wherein the one or more programs are stored in the memory and configured to be executed by one or more processors containing instructions for performing following operations:
determining an idle channel, and transmitting a data handshake request carrying interruption information on the idle channel, wherein the interruption information at least comprises an indication for interrupting a call of a traffic channel;
receiving a data handshake response transmitted by a repeater;
when the data handshake response is of a type allowing interruption, jumping to the traffic channel designated by the repeater according to a channel jumping indication comprised in the data handshake response; and
when determining that a second terminal occupying the traffic channel interrupts the call and releases a resource of the traffic channel, initiating a new call on the traffic channel.

\* \* \* \* \*